United States Patent [19]

Robitschek et al.

[11] 4,403,013
[45] Sep. 6, 1983

[54] THERMOSETTING RESIN GLUES FOAMABLE TO HIGH DENSITY

[75] Inventors: Paul Robitschek; Jeffrey B. Stone, both of Eugene, Oreg.

[73] Assignee: Chembond Corporation, Springfield, Oreg.

[21] Appl. No.: 375,533

[22] Filed: May 6, 1982

Related U.S. Application Data

[63] Continuation of Ser. No. 127,931, Mar. 7, 1980, abandoned.

[51] Int. Cl.³ .................................................. B32B 3/26
[52] U.S. Cl. .................................. 428/318.4; 521/122; 521/128; 521/129; 521/187; 521/188
[58] Field of Search ................ 521/122, 128, 129, 187, 521/188; 428/318.4

[56] References Cited

U.S. PATENT DOCUMENTS

| | | | |
|---|---|---|---|
| 2,446,429 | 8/1948 | Nelson et al. | 521/181 |
| 3,821,337 | 6/1974 | Bunclark et al. | 521/181 |
| 4,208,485 | 6/1980 | Nahta | 521/188 |

Primary Examiner—Morton Foelak
Attorney, Agent, or Firm—Shanley, O'Neil and Baker

[57] ABSTRACT

A glue foamable to high density comprises an aqueous alkaline thermosetting resin and a surfactant comprising (1) a fatty acid amide of the alkanol-amines or (2) a tertiary amine oxide used in amount sufficient to render the glue foamable to a stable foam having a density of at least 0.5 and a viscosity of from 1,000 to 20,000 centipoises upon being beaten with air. The glue is useful particularly in the manufacture of plywood.

14 Claims, 1 Drawing Figure

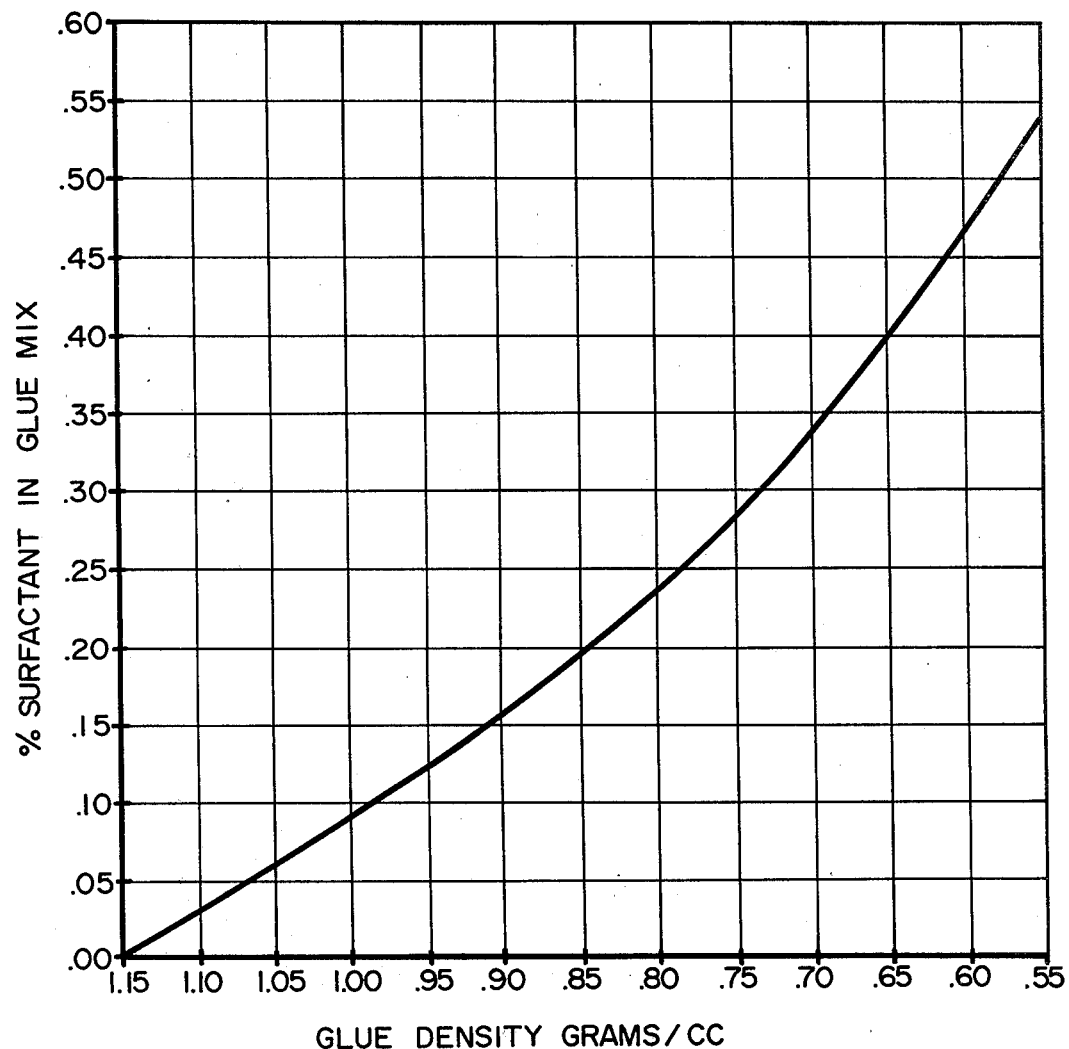

THERMOSETTING RESIN GLUES FOAMABLE TO HIGH DENSITY

This is a continuation of application Ser. No. 127,931, filed Mar. 7, 1980, now abandoned.

BACKGROUND OF THE INVENTION

This invention relates to glues of the class useful in the manufacture of plywood. It pertains particularly to glues which are foamable to produce stable, high density foams.

The use of foamed glues in the manufacture of plywood is advantageous for many reasons, including, particularly, uniformity of plywood product and economy of glue use. Their application is illustrated in a number of U.S. patents, of which U.S. Pat. Nos. 2,323,831 and 3,905,921 are illustrative.

It is characteristic of the prior art foamed plywood glues that they are of low density, i.e. a density of less than 0.5 grams/cc., usually less than 0.3 grams/cc.. The low density inherently results from the foaming operation by which the glues are produced.

The prior art foamed glues are difficult to convey because of their high viscosity and low density. This in turn makes them unsuitable for application in conventional plywood glue application equipment such as spreaders, curtain coaters, and sprayers. Specialized equipment, accordingly, is required to convey the glues and to spread them in the uniform spreads required to achieve a manufactured plywood product of uniform properties.

It is the general object of this invention to provide thermosetting resin glues which are foamable to high density, i.e. a density above 0.5 grams/cc., and to viscosities in the broad range of from 1,000 to 20,000 centipoises.

Further objects of the present invention are the provision of thermosetting resin glues which are foamable to produce adhesive foams which are stable in density and viscosity, which can be readily conveyed, and which can be applied without difficulty by the spreaders, curtain coaters and spray applicators which are standard equipment in the conventional plywood mill.

Still another object of the present invention is the provision of foamable glues having the above mentioned properties which in addition are highly adhesive, having bonding properties superior to conventional glues on an equal weight basis, or equal thereto when used at lower spreads of foamed glue.

Broadly considered, the foamable glues of our invention comprise at least one aqueous alkaline thermosetting resin of the group consisting of the phenol-formaldehyde-, resorcinol-formaldehyde-, resorcinol-phenol-formaldehyde-, urea-formaldehyde-, and urea-melamine-formaldehyde-thermosetting resins, and at least one surfactant of the class consisting of:

(1) the fatty acid amides of the alkanol amines having the following structure

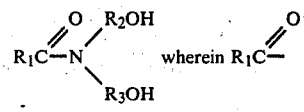

is a fatty acid radical of 8 to 18 carbon atoms, and $R_2$ and $R_3$ are lower alkyl radicals, and (2) the tertiary amine oxides having the following structure

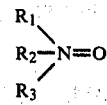

wherein $R_1$ is an alkyl radical of 8 to 18 carbon atoms and $R_2$ and $R_3$ are lower alkyl radicals. The surfactant is used in amount sufficient to render the glue foamable with a non-reactive gas to a stable foam having a density of more than 0.5 and a Brookfield viscosity of from 1,000 to 20,000 centipoises at 25° C. and 20 rpm.

Further included in the glues in amount appropriate to develop the desired properties are clay, a bodying agent, an alkaline material and water.

DESCRIPTION OF PREFERRED EMBODIMENTS OF THE INVENTION

As indicated above, the concept of the invention is applicable to the production of plywood and other glues foamable to high density using as base resins the thermosetting phenol-formaldehyde-, resorcinol-formaldehyde-, resorcinol-phenol-formaldehyde-, urea-formaldehyde-, and urea-melamine-formaldehyde-thermosetting resins.

These may be employed in the forms in which they are conventionally used for the manufacture of liquid plywood glues, i.e. in aqueous alkaline solution containing 4 to 8% caustic at viscosities of from 100 to 3,000 centipoises, and a resin solids content of from 40 to 56% by weight. They are formulated into the foamable glues of the invention by admixture with surfactant, clay, bodying agent, alkaline material and water in the general and specific proportions indicated below, percentage by weight, solids basis.

|  | Broad Range (all resins) | Phenol Formaldehyde Resin | Urea-Formaldehyde- or Urea-Melamine-Formaldehyde-Resin | Resorcinol-Formaldehyde- or resorcinol-phenol-formalde-hyde-resin |
|---|---|---|---|---|
| Liquid Thermosetting Resin (Solids basis) | 10 to 50 | 20-35 | 15-30 | 30-45 |
| Surfactant | 0.1 to 5 | .15-.60 | .15-.60 | .15-5 |
| Clay | 0 to 10 | 1-3 | 1-5 | 0-10 |
| Bodying Agent | 0 to 40 | 5-12 | 20-40 | 0-10 |
| Alkaline Material | 0 to 6 | 0-6 | — | — |

-continued

| | Broad Range (all resins) | The Resin is a | | |
|---|---|---|---|---|
| | | Phenol Formaldehyde Resin | Urea-Formaldehyde- or Urea-Melamine-Formaldehyde-Resin | Resorcinol-Formaldehyde- or resorcinol-phenol-formaldehyde-resin |
| Water* | 0 to 55 | 10–30 | 25–40 | — |

*in addition to that contained in the liquid thermosetting resin component.

Investigation of a large number of surfactants has revealed only two classes of the same the use of which in the above formulation achieves the desired purpose of producing a glue foamable to a stable, high density foam of the desired viscosity.

One such surfactant class comprises the fatty acid amides of the alkanol-amines having the following structure:

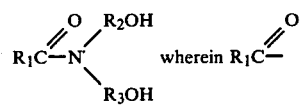

is a fatty acid radical of 8 to 18 carbon atoms, and $R_2$ and $R_3$ are lower alkyl radicals.

These surfactants may be prepared by condensing the fatty acids, or fatty acid esters containing fatty acid radicals, or acyl groups, of 8 to 18 carbon atoms with a lower alkylol, i.e. one having 1–4 carbon atoms in the alkyl group.

A particularly suitable surfactant of this class is produced by condensing coconut oil fatty acids or fatty acid esters with diethanol amine. Coconut oil contains acid groupings comprising about 7% capric, 49% lauric, 17% myristic, 9% palmitic and 6% oleic acid radicals. The surfactant derived therefrom accordingly will have a corresponding composition.

Such fatty acid amides are referred to in the surfactant trade as "Superamides." One such product which is available commercially is that sold under the brand name "VARAMIDE," a product of Ashland Chemicals of Columbus, Ohio.

Although coconut oil offers a convenient and readily available source of suitable fatty acid and fatty acid ester components, other naturally occurring, or synthetically derived fats and oils may be employed as source materials, provided their fatty acid content conforms to the above requirements.

As also indicated above, another class of surfactant suitable for the present purposes comprises the tertiary amide oxides having the following structure:

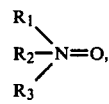

wherein $R_1$ is an alkyl radical of 8 to 18 carbon atoms and $R_2$ and $R_3$ are lower alkyl radicals.

These compounds are prepared by the oxidation of a tertiary amine by an oxidizing agent such as hydrogen peroxide. Again, coconut oil is a suitable source material for the high molecular weight fatty component of the tertiary amine oxides. Alcohols having alkyl radicals containing from 8 to 18 carbon atoms, as required for $R_1$, are produced industrially by the reduction of coconut oil derivatives. The other substituent groups of the amine oxide, i.e. $R_2$ and $R_3$, are lower alkyl radicals such as methyl, ethyl and propyl obtainable from a variety of sources.

Whatever its identity, the surfactant is employed in amount sufficient to render the glue foamable with a non-reactive gas such as air or nitrogen to a stable foam having a density of more than 0.5. More specifically, the surfactant is employed within the range of from 0.1 to 5% by weight of the total glue composition.

A third component which may be included to advantage in the hereindescribed foamable glues comprises clay. The clay serves the function of imparting static stability to the foam. With the clay present, at least 24 hours foam static stability is obtained. Without the clay, the static stability is reduced to a few hours, which is sufficient for some purposes. The clay thus serves as a supplementary foam stabilizer which extends the foam life of the glue.

As shown hereinafter in the Examples, a particularly suitable clay for use in the glues of the invention comprises attapulgus clay. This material, which is commonly called attapulgite, is a crystalline, hydrated magnesium aluminum silicate. It is particularly effective in imparting foam stability to the glue compositions.

The clay is used in varying amount depending upon the identity of the other constituents of the glue. However, in general, from 0 to 10% by weight of clay may be employed to advantage.

The bodying or thickening agent, which is another important component of the hereindescribed glue, serves the function of improving the bonding quality of the glue by reducing penetration of the glue into the wood veneer substrate. It also raises the glue viscosity. This, in turn, improves the bonding quality for the same reason.

A variety of conventional bodying or thickening agents, both proteinaceous and amylaceous, may be used for this purpose. Illustrative of suitable ones include wheat flour, rye flour, potato flour, soya flour, the various natural gums, and methocel.

A further component of the hereindescribed glues comprises a caustic or alkaline material such as caustic soda, sodium carbonate, or other alkaline, basic acting compound, such as a basic acting compound of an alkali metal, of the class conventionally employed for adjusting the pH of plywood glues. This is used in amount sufficient to maintain the pH of the glue above 9. It serves the function of solvating the bodying or thickening components of the glue and thereby reducing the degree of glue penetration into the wood.

Although the phenolic and other thermosetting resins of the classes used herein are available commercially and used in the form of their aqueous alkaline solutions, it may be desirable or necessary to incorporate a proportion of water as another constitutent of the glue mix.

In this event, sufficient water is employed to adjust the solids content and viscosity to desired levels.

In formulating the glues of the invention the resin component is compounded with the cited ingredients in the following preferred order, which may be changed as desirable or necessary:

The resin first is mixed with the surfactant, then with the clay, then with the bodying agent, then with the water. The resulting composition is mixed in a conventional high shear or paddle mixer until fully dispersed. Caustic next is introduced and the mixing continued to a predetermined viscosity. If desired, the resin may be added in two stages; part at the beginning and the remainder after the other constituents have been mixed in.

The resulting mixed, unfoamed glue is subjected to mechanical foaming by any suitable means which introduces air, nitrogen, or other inert (to the glue) gas into the composition. The apparatus employed may be a conventional beater, or apparatus for introducing air into a constricted chamber in which the glue is repeatedly rotated between shear blades.

The resulting glue in its foamed condition is ready for storage or immediate use. It will be characterized by a density of more than 0.5, preferably between 0.6 and 0.75 grams/cc. at 25° C. Its viscosity will be from 1,000 to 20,000, preferably between 5,000 and 10,000 centipoises as measured by a Brookfield viscometer at 20 rpm and 25° C.

Characterized by these qualities, the foamed glues of the invention can be readily pumped and conveyed in the glue lines of the conventional mill. They also can be applied without difficulty in conventional spreaders, curtain coaters and spray coaters.

Furthermore, the foams are stable both as to density and viscosity, enabling their storage for periods of as much as one week. They also are resistant to substantial viscosity change with temperature.

Comparative tests indicate that the bonding qualities of the hereindescribed high density foamed glues are superior to conventional glues on an equal weight basis, or equal thereto at lower weights of the foamed glues. The validity of these observations is indicated in the following examples, wherein the amounts of the glue components are given in percent by weight, solids basis.

EXAMPLE 1A

This example illustrates the formulation of the glues of the invention incorporating a phenol formaldehyde thermosetting resin and a surfactant comprising the condensation product of di-ethanol amine with coconut oil fatty acids ("Varamide;" Ashland Chemical Co.) at various resin solids content.

This example illustrates a glue containing 31.2% resin solids

|  | | % By Weight | |
|---|---|---|---|
| Water | | 12.23 | |
| Wheat Flour | | 7.22 | |
| Resin (41% N.V.) | | 24.07 | |
| Attapulgus Clay | | | |
| Mix 10 minutes | | 1.40 | |
| 50% Caustic Soda | | | |
| Mix 15 minutes | | 2.61 | |
| Resin (41% N.V.) | | 52.15 | |
| Surfactant ("Varamide") | | | |
| Mix 5 minutes | | .32 | |
| Unfoamed | viscosity 3500 cps | Density | 1.10–1.15 g/cc |
| Foamed | viscosity 6500 cps | Density | .60–.70 g/cc |

To demonstrate the relationship between the amount of surfactant employed and the density of the resulting glue, a series of glues were prepared identical to the above, but with varying amounts of surfactant. The densities of the resulting foamed glues are given below, are graphed in the drawing.

| % Surfactant | Foamed Glue Density |
|---|---|
| .24 | .81 |
| .32 | .67 |
| .40 | .65 |
| .54 | .56 |

EXAMPLE 1B

This example illustrates the formulaton of a glue containing 26.0% resin solids.

|  | | % By Weight | |
|---|---|---|---|
| Water | | 23.33 | |
| Wheat Flour | | 9.03 | |
| Resin (41% N.V.) | | 11.26 | |
| Attapulgus Clay | | | |
| Mix 10 minutes | | 1.31 | |
| 50% Caustic Soda | | | |
| Mix 15 minutes | | 2.60 | |
| Resin (41% N.V.) | | 52.15 | |
| Surfactant | | | |
| Mix 5 minutes | | .32 | |
| Unfoamed | viscosity 3500 cps | Density | 1.10–1.15 g/cc |
| Foamed | viscosity 6500 cps | Density | .60–.70 g/cc |

EXAMPLE 1C

This example illustrates the formulation of a glue utilizing 31.5% resin solids.

|  | | % By Weight | |
|---|---|---|---|
| Water | | 29.13 | |
| Wheat Flour | | 10.00 | |
| Resin (56% N.V.) | | 10.25 | |
| Attapulgus Clay | | | |
| Mix 10 minutes | | 1.50 | |
| 50% Caustic Soda | | | |
| Mix 15 minutes | | 2.63 | |
| Resin (56% N.V.) | | 46.17 | |
| Surfactant | | | |
| Mix 5 minutes | | .32 | |
| Unfoamed | viscosity 2500 cps | Density | 1.10–1.15 g/cc |
| Foamed | viscosity 5600 cps | Density | .60–.70 g/cc |

The glues of Examples 1A, 1B and 1C were tested for foam stability and viscosity stability by the following tests:

Test 1: The foamed glue composition after introduction in a measuring cylinder retains at least 90% of its original volume for at least 24 hours.

Test 2: 2,000 Grams of the foamed glue is introduced between a cooperating rubber roll and doctor roll, rotating in opposite directions and having a nip space between them of approximately 0.050 inches. The rolls are rotated at approximately 59 rpm. The viscosity and density of the glue are measured prior to introduction of the glue to the spreader.

The spreader is operated for 30 minutes. The viscosity and density of the glue then are re-measured. To be suitable, these properties of the glue should not deviate by more than 10% from their original value.

All three of the glues formulated as above successfully passed the foregoing tests. Where the hereindescribed critical surfactants are employed, not only is the desired high glue density obtained, but this density is retained when the glue is subjected to the shear test outlined above. If the glue is adequately foamed by simple mechanical means, additional mechanical foaming does not change the density. The constancy of foam density under these conditions is a primary advantage, characteristic of the glues of the invention, as is the ability to control foam density accurately by using an accurately controlled amount of surfactant. The latter characteristic is shown clearly in the graph of the drawing.

EXAMPLE 2

This example indicates the unique character of the surfactants employed in the glues of the invention.

The properties of the glue of Example 1A were compared with the properties of glues prepared in an identical manner, but using a variety of surfactants of other standard classes viz:

| Trade Name | Manufacturer | Chemical Class & Structure |
| --- | --- | --- |
| Sipex - BOS | Alcolac | Sodium 2-ethylhexyl sulfate |
| Zonyl FSC | DuPont | Fluoro alkyl dimethyl sulfate quaternary amine (Alkyl = $C_7$ or $C_8$) |
| Zonyl FSB | DuPont | Fluoro alkyl sulfonated betaine (Alkyl = $C_7$ or $C_8$) |
| Dow Corning 193 | Dow Corning | Silicone glycol copolymer |
| Dupanol EP | DuPont | Alkyl alkylol dimethylamine sulfate (Alkyl = $C_{12}$) |
| Areosol OT | American Cyanamid | Sulfosuccinate diester (R = $C_8$)   $CH_2\text{—}COOR$ <br> $\quad\quad\quad\quad\quad\quad\quad\quad\quad NaO_3SCHCOOR$ |
| Tween 40 | ICI Americas | Polyoxyethylene (20) sorbitan monopalmitate |
| Crufax DA (3) | Crucible Chemical | Alkanolethoxylate (Alkyl = $C_8$–$C_{16}$) |
| Crufax 3.5 | Crucible Chemical | Alkanolethoxylate (Alkyl = $C_8$–$C_{16}$) |
| Varamide A2 | Ashland Chemical | (2:1) Alkanolamide (Refined coconut oil Diethanolamide) Alkyl = $C_8$–$C_{18}$ |

The resulting foamed glues were tested by the stability tests outlined above. All of them failed the tests in that the volume of each foamed glue diminished by more than 10% after standing 24 hours. Also, the viscosity and density of each glue deviated by more than 10% from its original value after being subjected to the shear test.

EXAMPLE 3

This example illustrates the application of the high density foamed glues of the invention to the manufacture of plywood.

The glues of Examples 1A, 1B and 1C were applied to both sides of 12"×12" Douglas Fir, ⅛" thick veneers, so that the amount deposited on each veneer was equivalent to 65 lbs of glue per 1,000 square feet of veneer. Each coated veneer was overlaid by a top and bottom layer of the same kind of ⅛" veneer to form a plywood laminate. This was placed in a steam heated press kept at 285° F. and pressed under 175 lbs. per square inch for 5 minutes.

The cooled plywood was subjected to a shear test under conditions specified by the vacuum pressure test in PS 1-74 of the American Plywood Association. The sheared specimens were then examined for percent wood failure. This represents the "Standard" conditions.

In the "Dry-Out" test a similar procedure was used, but the veneers were dried to essentially 0% moisture content and glued in this condition with a 45 lb. spread. This test defines glue properties under highly adverse conditions.

The table below illustrates the results, compared with percent wood failure of plywood made using a conventional, commercial phenol-formaldehyde control glue containing 31% resin solids, 9% furafil extender, 5% wheat flour and 2.5% caustic soda, applied using the same spreads and conditions.

|  | Composition | | | Conventional |
| --- | --- | --- | --- | --- |
|  | 1A | 1B | 1C | Glue |
| % Wood failure under "Standard Conditions" | 100% | 98% | 100% | 98% |
| % Wood failure under "Dry-Out Conditions" | 99% | 85% | 98% | 65% |

The test results show that under "Standard Conditions" the glue of this invention is equal to the conventional glue and is superior under "Dry-Out Conditions."

EXAMPLE 4

This example illustrates a urea type high density foam glue of the invention.

The glue had the following composition:

|  | % By Weight |
| --- | --- |
| Urea-formaldehyde resin (60–65% by weight solids) | 35 |
| Water | 31 |
| Wheat flour | 28.5 |
| Catalyst (Ammonium Chloride, 25% solution in water) | 4 |
| Attapulgus Clay | 1.3 |
| Surfactant ("Superamide") | 0.2 |

The glue was foamed to a density of 0.62 grams/cc. in the manner described in Example 1. The resulting foam was stable under shear conditions and maintained its density for over 24 hours.

The performance of this glue was compared with that of a conventional urea glue having the following composition:

|  | % By Weight |
|---|---|
| Urea-formaldehyde resin (60–65% by weight solids) | 35 |
| Water | 31 |
| Wheat flour | 30 |
| Catalyst (Ammonium Chloride, 25% solution in water) | 4 |

Both the foamed glue of the invention and the control liquid glue were applied to wood veneers in the manner described in Example 2, utilizing in each case a 65 pound spread for 1,000 square feet of glue line. The assemblies were pressed into plywood for 3 minutes at 260° F. The resulting plywood samples were tested with results as follows:

The samples were tested as specified in PS 1-74 of the American Plywood Association, involving a water soak test. Both the conventional and glue of Example 4 showed no visible delamination, constituting passing performance.

EXAMPLE 5

This example illustrates a foamed resorcinol phenol formaldehyde glue of the invention.

Typical resorcinol glues contain a resin which has as the phenolic component a mixture of 10–50% resorcinol and 20–60% of phenol. The typical 50% solids resorcinol resin used in this example as a control was prepared in the conventional manner from 45 parts by weight phenol, 10 parts formaldehyde, 15 parts resorcinol and 1.5 parts caustic soda.

The resorcinol glue of the invention was prepared from this resorcinol glue composition as follows:

|  | Parts by Weight |
|---|---|
| Resorcinol Resin | 100 |
| Paraformaldehyde | 10 |
| Wood Flour | 10 |
| Attapulgus Clay | 2 |
| Surfactant ("Superamide") | 4 |

The glue of the invention was prepared and foamed as described in Example 1 to a density of 0.65 grams/cc.

The foamed test glue and liquid control glue were applied to wood veneers in the manner described in Example 1, utilizing a spread of 100 pounds per 1,000 square feet of glue line. The assemblies were pressed into plywood for seven hours at 77° F. The resulting plywood samples were then tested with results as follows:

The resulting plywood samples were then tested in accordance with MIL-A-397B for dry and wet shear. The specimens passed the test by exceeding a strength of 400 p.s.i.

Having thus described our invention in preferred embodiments, we claim:

1. Combination of components for use in formulating foamable wood lamination glue to maintain a desired high density during and after mechanical foaming with a non-reactant gas comprising an aqueous alkaline thermosetting resin selected from the group consisting of phenol-formaldehyde-resin, urea-formaldehyde-resin, urea-melamine-formaldehyde-resin, and resorcinal-formaldehyde-resin, such resins having resin solids content in the range of about 40% to 65% by weight, and a surfactant selected from the group consisting of fatty acid amides of the alkanol-amines having the following structure

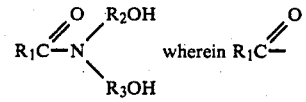

is a fatty acid radical of 8 to 18 carbon atoms, and $R_2$ and $R_3$ are lower alkyl radicals, and tertiary amine oxides having the following structure

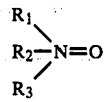

wherein $R_1$ is an alkyl radical of 8 to 18 carbon atoms and $R_2$ and $R_3$ are lower alkyl radicals, such surfactant being incorporated and mixed in an amount between about 0.1% and about 5% by weight of such resin to control mechanical foaming with a non-reactant gas by maintaining a density of at least 0.5 g/cc during such mechanical foaming and extending thereafter for a period of about twenty-four hours, such density being measured at 25° C.

2. A wood lamination glue foamable with a non-reactive gas while maintaining density above a desired high level comprising:

at least one aqueous alkaline thermosetting resin selected from the group consisting of phenol-formaldehyde-resin, urea-formaldehyde-resin, urea-melamine-formaldehyde-resin, and resorcinal-formaldehyde-resin, at least one surfactant selected from the group consisting of fatty acid amides of the alkanol-amines having the following structure

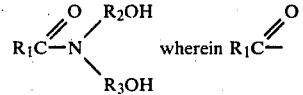

is a fatty acid radical of 8 to 18 carbon atoms, and $R_2$ and $R_3$ are lower alkyl radicals, and tertiary amine oxides having the following structure

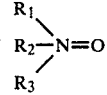

wherein $R_1$ is an alkyl radical of 8 to 18 carbon atoms and $R_2$ and $R_3$ are lower alkyl radicals, a foam stabilizing clay,
a glue bodying agent, and
water, the water being used in an amount to provide a solids content between about 40% and about 65% of such combined components, the surfactant being present in an amount sufficient to render such combination of components foamable using a gas, which is non-reactive with such components, to a stable foam having a density of more than 0.5 g/cc and a Brookfield viscosity value above 1,000 to about 10,000 centipoises at 25° C., such foamed glue being stable as to density and viscosity for periods of time in the range of twenty-four hours to about one week, the pH of such combination of components being controlled to a value about 9 and higher.

3. The lamination glue of claim 2 wherein the thermosetting resin selected is a phenol formaldehyde resin and wherein components are in the following proportions expressed as percent by weight, solids basis:

| thermosetting resin | 20 to 35% |
|---|---|
| surfactant | .1 to 5% |
| foam stabilizing clay | 1 to 3% |
| glue bodying material | .5 to 12% |
| water | 10 to 30%, | and further including
an alkaline material for controlling the pH of such lamination glue,
the alkaline material being added in amounts up to 3% by weight after combining such resin and surfactant with the clay and dispersion mixing of such bodying agent.

4. The lamination glue of claim 2 wherein the thermosetting resin is selected from the group consisting of urea formaldehyde and urea melamine-formaldehyde and wherein components are in the following proportions expressed in percent by weight, solids basis:

| thermosetting resin | 15 to 30% |
|---|---|
| surfactant | .1 to 5% |
| foam stabilizing clay | 1 to 5% |
| glue bodying agent | 20 to 40% |
| water | 25 to 40%, | and, further including
an inorganic salt catalyst for accelerating curing of such lamination glue comprising about 4% by weight of the combined components.

5. The lamination glue of claim 2 wherein the thermosetting resin selected is a resorcinol-formaldehyde resin and wherein components are in the following proportions expressed as percent by weight, solids basis:

| thermosetting resin | 30 to 45% |
|---|---|
| surfactant | .1 to 5% |
| foam stabilizing clay | 2 to 10% |
| glue bodying agent | about 10%. |

6. The lamination glue of claim 2 wherein the surfactant selected is a fatty acid amide of the alkanolamines wherein

is a mixture of fatty acid radicals of coconut oil and wherein $R_2$ and $R_3$ are ethyl.

7. The lamination glue of claim 2 wherein the surfactant selected is a tertiary amine oxide wherein $R_1$ is a mixture of alkyl radicals of the hydrogenated fatty acids of coconut oil and $R_2$ and $R_3$ are ethyl.

8. The lamination glue of claim 2 wherein the foam stabilizing clay comprises attapulgus clay.

9. The laminated glue of claim 2 wherein the glue bodying agent material is selected from the group consisting of amylaceous and proteinaceous materials.

10. Method for improving the foaming characteristics of components of a wood lamination glue, to controllably limit the effect of mechanical foaming with a non-reactive gas by maintaining a desired high density during and after such foaming, comprising the steps of selecting a surfactant from the group consisting of fatty acid amides of the alkanol-amines having the following structure

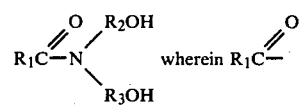

is a fatty acid radical of 8 to 18 carbon atoms, and $R_2$, and $R_3$ are lower alkyl radicals, and tertiary amine oxides having the following structure

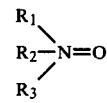

wherein $R_1$ is an alkyl radical of 8 to 18 carbon atoms and $R_2$ and $R_3$ are lower alkyl radicals, selecting an aqueous alkaline thermosetting resin from the group consisting of phenol-formaldehyde-resin, urea-formaldehyde-resin, urea-melamine-formaldehyde resin, and resorcinal-formaldehyde-resin, and mixing such selected surfactant with the selected resin, such resin having resin solids content in the range of about 40% to 65% by weight, and such selected surfactant being added in an amount between about 0.1% and 5% by weight of the selected resin to controllably limit the effect of mechanically foaming such combination of components with a non-reactive gas by maintaining a density of more than 0.5 g/cc during such foaming and extending for a period of about twenty-four hours, such density of the foamed components being measured at 25° C.

11. Method for manufacturing a stable foamed wood lamination glue while maintaining density of the foamed glue above a selected level, comprising
providing:
a thermosetting resin selected from the group consisting of phenol-formaldehyde-resin, urea-formaldehyde-resin, urea-melamine-formaldehyde-resin, and resorcinal-formaldehyde-resin, combined with a surfactant selected from the group consisting of fatty acid amides of the alkanol-amines having the following structure

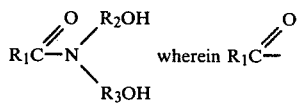

is a fatty acid radical of 8 to 18 carbon atoms, and $R_2$ and $R_3$ are lower alkyl radicals, and tertiary amine oxides having the following structure

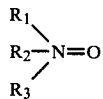

wherein $R_1$ is an alkyl radical of 8 to 18 carbon atoms and $R_2$ and $R_3$ are lower alkyl radicals, and adding:

a foam stabilizing clay, and
a glue bodying agent by:
mixing the foam stabilizing clay with at least a portion of such combined resin and surfactant, then
mixing the glue bodying agent with such clay and at least a portion of the combined resin and surfactant,
completing addition of any remaining portion of the combined thermosetting resin and surfactant, then
adding water in an amount to provide a selected solids content of about 40% to 65% and mixing until components are fully dispersed,
controlling pH of such mixture to be about 9 and higher and,
while holding such mixture in a chamber for foaming,
introducing a gas which is non-reactive with the combined components into the mixture in such chamber, and
mechanically foaming such mixture of components in such chamber to form a foamed glue which is stable as to density and viscosity for periods of time in the range of twenty-four hours to about one week and having a density above 0.5 g/cc and a Brookfield viscosity value above 1,000 centipoises to about 10,000 centipoises,
such density and viscosity being measured at 25° C.

12. The method of claim 11 in which the resin selected is a phenol-formaldehyde-resin and wherein the components are mixed in the following proportion by weight, solids basis:

|  |  |
|---|---|
| thermosetting resin | 20 to 35% |
| surfactant | .1 to 5% |
| foam stabilizing clay | 1 to 3% |
| glue bodying material | 5 to 12% |
| water | 10 to 30%, | and
controlling pH is carried out by
adding an alkaline materials in amounts up to 3% by weight of such components before the mechanical foaming step.

13. The method of claim 11 in which the resin is selected from the group consisting of urea formaldehyde and urea melamine-formaldehyde and wherein the components are mixed in the following proportions expressed in percent by weight, solids basis:

|  |  |
|---|---|
| thermosetting resin | 15 to 30% |
| surfactant | .1 to 5% |
| foam stabilizing clay | 1 to 5% |
| glue bodying material | 20 to 40% |
| water | 25 to 40%, | and, further including
adding an inorganic salt catalyst comprising about 4% by weight of the combined components after mixing and before mechanical foaming of such components.

14. In combination:
a pair of wood laminate layers with confronting extended planar surface areas joined by a foamed wood lamination glue,
the wood lamination glue comprising
at least one thermosetting resin selected from the group consisting of phenol-formaldehyde-resin, urea-formaldehyde-resin, urea-melamine-formaldehyde resin, and resorcinal-formaldehyde-resin,
at least one surfactant selected from the group consisting of
fatty acid amides of the alkanol-amines having the following structure

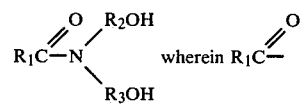

is a fatty acid radical of 8 to 18 carbon atoms, and $R_2$ and $R_3$ are lower alkyl radicals, and tertiary amine oxides having the following structure

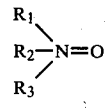

wherein $R_1$ is an alkyl radical of 8 to 18 carbon atoms and $R_2$ and $R_3$ are lower alkyl radicals,
a foam stabilizing clay,
a glue bodying agent, and
water,
the water being present in an amount to provide a solids content between about 40% and about 65% of such combined components,
the surfactant being present in an amount sufficient to render such combination of components foamable using a gas which is non-reactive with such components to a stable foam having a density of more than 0.5 g/cc and a Brookfield viscosity value above 1,000 to about 10,000 centipoises at 25° C.,
such foamed glue being stable as to density and viscosity for periods of time in the range of twenty-four hours to about one week,
the pH of such combination of components being controlled to a value about 9 and higher,
such lamination glue being spread between such confronting planar surfaces within a weight range of about 22.5 to about 50 pounds per 1,000 square feet of surface area of one of such wood laminate layers.

* * * * *